United States Patent [19]

Kawai

[11] Patent Number: 4,725,909
[45] Date of Patent: Feb. 16, 1988

[54] VERTICAL MAGNETIC HEAD COMPRISING MEANS FOR CONVERGING MAGNETIC FLUX TO ENABLE HIGH DENSITY RECORDING

[75] Inventor: Masahiro Kawai, Hachioji, Japan

[73] Assignee: Olympus Optical Co., Ltd., Tokyo, Japan

[21] Appl. No.: 45,747

[22] Filed: Apr. 30, 1987

Related U.S. Application Data

[63] Continuation of Ser. No. 663,917, Oct. 23, 1984, abandoned.

[30] Foreign Application Priority Data

Oct. 24, 1983 [JP]  Japan ................. 58-198755

[51] Int. Cl.$^4$ .............. G11B 5/147; G11B 5/187; G11B 5/17
[52] U.S. Cl. ................. 360/126; 360/122; 360/123
[58] Field of Search ............. 360/119-123, 360/125, 126, 127, 113

[56] References Cited

U.S. PATENT DOCUMENTS

| | | | |
|---|---|---|---|
| 4,100,584 | 7/1978 | Behr et al. | 360/119 |
| 4,441,131 | 4/1984 | Osanai | 360/119 |
| 4,566,050 | 1/1986 | Beam et al. | 360/122 |

FOREIGN PATENT DOCUMENTS

| | | | |
|---|---|---|---|
| 3120549 | 3/1982 | Fed. Rep. of Germany | 360/113 |
| 0205811 | 12/1982 | Japan | 360/113 |
| 0017516 | 2/1983 | Japan | 360/119 |
| 0092422 | 5/1984 | Japan | 360/122 |
| 2135500 | 8/1982 | United Kingdom | 360/122 |

*Primary Examiner*—Robert S. Tupper
*Assistant Examiner*—Melissa J. Koval
*Attorney, Agent, or Firm*—Armstrong, Nikaido, Marmelstein & Kubovcik

[57] ABSTRACT

A vertical magnetic head for recording information on a recording medium and reproducing the recorded information from the recording medium with high density employing a main magnetic pole and auxiliary magnetic pole(s). The head comprises a main magnetic pole and auxiliary magnetic pole(s) attached to the main magnetic pole and spaced apart therefrom in the direction generally perpendicular to the moving direction of the recording medium. The recording/reproduction is carried out under the condition that a plane including said both magnetic poles is perpendicular to the moving direction of the recording medium. Further, the auxiliary pole is tapered in the direction of the main magnet so that the narrowest part of the auxiliary pole is nearest the main magnetic pole.

3 Claims, 5 Drawing Figures

VERTICAL MAGNETIC HEAD COMPRISING MEANS FOR CONVERGING MAGNETIC FLUX TO ENABLE HIGH DENSITY RECORDING

This application is a continuation of application Ser. No. 663,917, filed Oct. 23, 1984, now abandoned.

BACKGROUND OF THE INVENTION

The present invention relates to a vertical magnetic head suitable for recording and reproducing a high density record.

Since the existing magnetic recording mode employing a magnetic head of a ring type utilizes the residual magnetization on the principal surface of a magnetic recording medium, i.e. a surface parallel to the magnetic film surface, when the recording density of signals is increased, the diamagnetic field within the recording medium is increased to cause the damping and rotation of residual magnetization to make the detection of recorded signals difficult or to decrease the S/N ratio of the detected signals.

For such a reason, there has been proposed a recorder having a vertical magnetic recording mode which utilizes the residual magnetization perpendicular to the magnetic film surface of a recording medium and can record by reducing the diamagnetic field when the recording density is increased.

FIG. 1 illustrates an existing vertical magnetic head employed for recording with said vertical magnetic recording mode.

The existing vertical magnetic head as shown in FIG. 1 comprises a main magnetic pole 3 comprising magnetic film having high magnetic permeability and arranged so as to be confronted with magnetic layer 2 performing the recording in recording medium 1, auxiliary magnetic pole 4 comprising a magnetic material and arranged so as to be confronted through said intervening magnetic medium 1 with said main magnetic pole 3 and coil 5 wound around said auxiliary magnetic pole 4, thereby passing magnetic fluxes 6 issued from auxiliary magnetic pole 4 being exited by means of coil 5 through base 7 defined on the rear surface of said recording medium 1 and through layer 8 having high magnetic permeability and magnetic layer 2 to be converged to said main magnetic pole 3 so that the vertical magnetic recording can be performed by forming the residual magnetization in the direction of thickness of said magnetic layer 2. In this figure the moving direction of the recording medium 1 is shown by arrow A.

However, since such a vertical magnetic head comprises an open path, it is affected by external noise and a diamagnetic field induced in main magnetic pole 3 and auxiliary magnetic pole 4. Since it has a structure having a large clearance between highly magnetic permeable layer 8 playing a roll in converging magnetic fluxes 6 to main magnetic pole 3 and auxiliary magnetic pole 4, the magnetic resistance becomes higher and the efficiencies for recording and reproducing are reduced. In addition, recording medium 1 is sandwiched between main and auxiliary magnetic poles, 3 and 4, so that the recording and reproducing cannot be performed from one side of recording medium 1 as in the conventional magnetic disk and magnetic tape resulting in the complicated head structure and also in the complicated mechanism for displacing the head in a direction perpendicular to the moving direction of recording medium 1 for attaching and detaching the recording medium.

In order to solve such problems, there has been provided a vertical magnetic head capable of recording and reproducing from one side of recording medium 1 as shown by another existing magnetic head as shown in FIG. 2.

In FIG. 2, the magnetic head comprises main magnetic pole 11 arranged so that the tip surface of pole 11 faces magnetic layer 2 of recording medium 1, auxiliary magnetic pole 13 installed so that the tip of pole 13 is apart from the pole 11 by a relatively large gap 12 and coil 14 is wound around said main magnetic pole 11, thereby inducing magnetic flux 15 from main magnetic pole 11 by coil 14. Magnetic flux 15 passes through magnetic layer 2 facing the tip of main magnetic pole 11 and through layer 8 having high magnetic permeability and through the magnetic path passing through magnetic layer 2 again to be converged into auxiliary magnetic pole 13 to perform the residual magnetization in the direction of the thickness of magnetic layer 2 of recording medium 1 moving in the direction of arrow A to perform the vertical magnetic recording.

Different from the first existing embodiment, in the second existing embodiment, the magnetic flux 15 arriving at auxiliary magnetic pole 13 from main magnetic pole 11 through recording medium 1 passes through auxiliary magnetic pole 13 and the joined portion with said auxiliary magnetic pole 13 to be returned to main magnetic pole 11 to define a closed magnetic path.

Accordingly, the recording and reproducing can be performed at one side in the second embodiment and a closed magnetic path is formed during the recording and reproducing so as to reduce external noise. The magnetic head is not affected severely by external noise and has relatively higher recording and reproducing efficiencies.

It should be noted, however, that since main magnetic pole 11 is excited, the density of magnetic flux 11 is higher at the portion at the vicinity of coil 14 than the tip of main magnetic pole 11 and the magnetic flux partially leaks, thus reducing the magnetic flux effective for the recording and reproducing. In addition, since main magnetic pole 11 and auxiliary magnetic pole 13 are attached in parallel to the moving direction A of recording medium, horizontal magnetic flux (represented by 15') is induced in the moving direction of A at the tip portion of main magnetic pole 11 to reduce the recording density. In addition, the gap 12 between main magnetic pole 11 and auxiliary magnetic pole 13 should be relatively large by the above-mentioned reason to extend the magnetic path from main magnetic pole 11 through layer 8 of high magnetic permeability to auxiliary magnetic pole 13 to limit the high efficiencies for the recording and reproducing. Still further, the reproduction is performed including the recorded magnetization on recording medium 1 at the side of auxiliary magnetic pole 13 tending to degrade the S/N ratio.

The embodiment disclosed in Japanese Patent Publication No. 15042/1981 has a structure similar to the second embodiment, so that it has a disadvantage that the S/N ratio tends to be degraded.

The embodiment disclosed in Japanese Patent Publication No. 82318/1977 comprises a magnetic head having the main magnetic pole of thin film prepared by sputtering Permalloy or the like on a glass substrate. Since, however, the structure is similar to the second and third embodiments of prior art, it has a similar disadvantage.

The embodiment disclosed in Japanese Patent Publication No. 42044/1981 has a structure similar to that of first embodiment and a disadvantage similar to that of first embodiment.

The embodiment disclosed in Japanese Patent Publication No. 165918/1981 has a structure similar to that of the third embodiment and the degradation of S/N ratio is prevented by detecting the magnetic flux from the auxiliary magnetic pole during the regeneration by designing to protrude slightly the tip of main magnetic pole from that of auxiliary magnetic pole to contact exclusively the main magnetic pole with the recording medium.

This embodiment has a disadvantage in that since the auxiliary magnetic pole is apart from the recording medium, the output signals is degraded not only in the recording but also in the reproduction.

BRIEF SUMMARY OF THE INVENTION

It is a principal object of the present invention to provide a vertical magnetic head which enables high density recording and reproduction.

It is another object of the present invention to provide a vertical magnetic head which enables the high S/N ratio.

It is a further object of the present invention to provide a vertical magnetic head which enables the effective recording and reproduction.

Further features and advantages of the present invention will be understood sufficiently from the following disclosure.

BRIEF DESCRIPTION OF THE DRAWINGS

FIGS. 3 to 5 illustrate an embodiment of the present invention, wherein FIG. 3 is a perspective view of the embodiment, FIG. 4 is a sectional view taken allong line B—B and FIG. 5 is a bottom view of the embodiment.

DETAILED DESCRIPTION OF THE EMBODIMENTS

Figure 1:
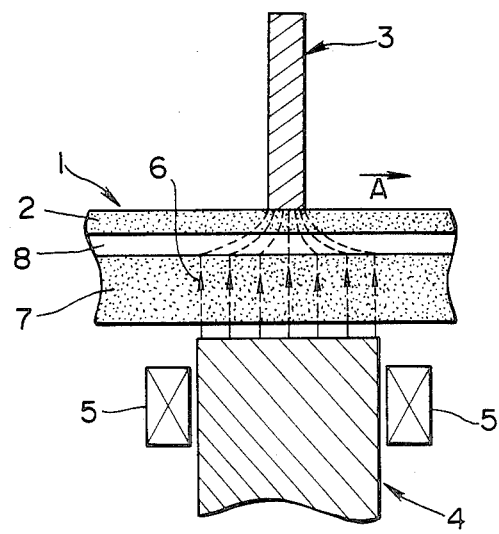
FIG. 1 shows a schematic sectional view of an embodiment according to prior art.
Figure 2:
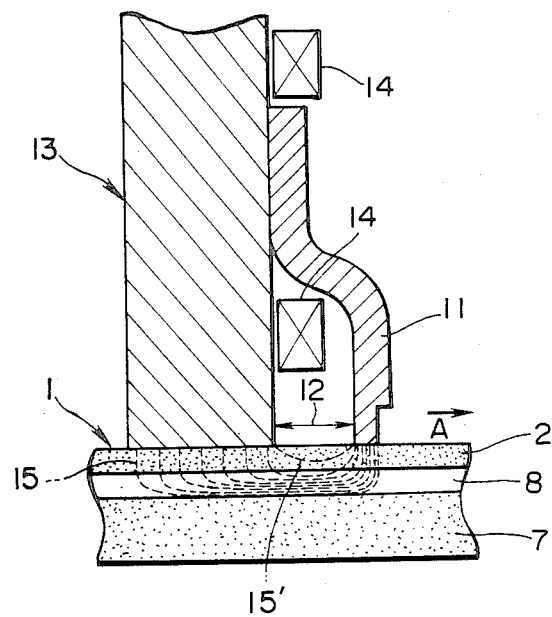
FIG. 2 is a schematic sectional view of another embodiment according to prior art.

Vertical magnetic head 21 of an embodiment according to the present invention comprises a main magnetic pole 22 arranged so that the tip surface thereof faces the surface of magnetic layer 2 of recording medium 1. Auxiliary magnetic poles 23, 23 are arranged perpendicular to the moving direction A of recording medium 1 and sandwich said main magnetic pole 22. Coils 24, 24 are wound around each auxiliary magnetic pole 23, 23.

Said main magnetic pole 22 has an approximately T shaped magnetic film or thin-walled magnetic sheet having high magnetic permeability and the major portion of main magnetic pole 22 except the tip portion is sandwiched between two thick-walled magnetic materials 25, 25 formed into a T-shape compatible with the T-shape of the main magnetic pole 22. The thick-walled materials 25, 25 are formed of, for example, Mn-Zn ferrite or the like so that they sandwich the main magnetic pole 22 perpendicular to the moving direction A thereby reducing the magnetic resistance of main magnetic pole 22. The tip portions of magnetic materials 25, 25 are attached with nonmagnetic materials 26, 26 such as glass or the like, thereby reducing the contact resistance of main magnetic pole 22 against recording medium 1 so as to be contacted smoothly with the medium 1.

Figure 5:
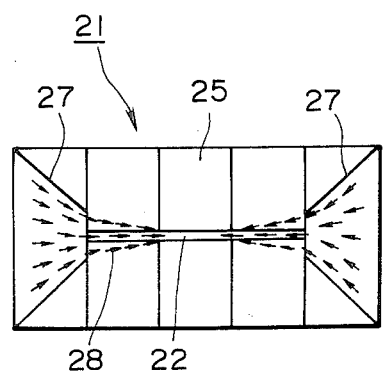

Substantially prismatic auxiliary magnetic poles 23, 23 are secured to the inner traverse ends of said main magnetic pole 22 attached with longitudinal magnetic materials 25, 25 having high magnetic permeability. Both longitudinal ends of each auxiliary magnetic pole 23 are notched at the portion under the upper portion wound with coil 24 and near recording medium 1 so that the surface facing main magnetic pole 22 is tapered to both longitudinal ends to form a traversely symmetric trapezoid having convergent portions 27, 27 for converging the magnetic flux as shown in FIG. 5. By notching the legs of each auxiliary magnetic pole 23 to form convergent portions 27, the contact surfaces of auxiliary magnetic poles 23, 23 form suitable azimuth angles with respect to the moving direction A of recording medium 1 to improve the recording density by converging magnetic flux 28 from each auxiliary magnetic poles 23, 23 through layer 8 having high magnetic permeability of recording medium 1 to main magnetic pole 22 as shown in FIG. 5, in order to enhance the magnetic resistance between main magnetic pole 23 and each auxiliary magnetic pole 23 and to reduce the leaked magnetic fluxes from each auxiliary magnetic pole 23 directly to main magnetic pole 22. In addition, the area of tip surface of each auxiliary magnetic pole 23 is substantially larger than the area of tip surface of main magnetic pole 22.

Moreover, auxiliary magnetic poles 23 are bonded with main magnetic pole 22 and magnetic material 25, 25 having high magnetic permeability and the legs thereof form closed magnetic paths passing through the magnetic layer 8 having high magnetic permeability to the tip of main magnetic pole 22 during the recording and reproduction so as to prevent any entrainment of external noises.

Figure 4:
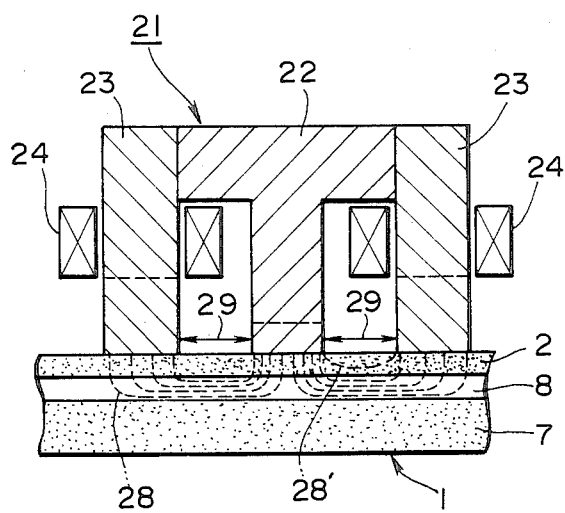

Furthermore, the embodiment of the present invention is characterized significantly by the fact that each auxiliary magnetic pole 23 is attached to the main magnetic pole 22 perpendicular to moving direction A so that if there is any horizontal component of magnetic flux passing from auxiliary magnetic pole 23 through magnetic layer 2 to main magnetic pole (as illustrated by symbol 28' in FIG. 4), as the magnetic fluxes 28' are perpendicular to moving direction A, the recording density is not reduced. Further, it is so arranged that two auxiliary magnetic poles 23 and 23 are provided on both sides of main magnetic pole 22 to have magnetic flux 28 which pass through magnetic layer 8, thereby preventing reduction in recording density due to magnetic saturation of said magnetic layer 8.

There will be now disclosed the operation of the embodiment having the above-mentioned mechanism.

Magnetic flux 28 from transversely arranged auxiliary magnetic poles 23, 23, being excited by the current of recording signals passing through coils 24, 24, converged through convergent portions 27 and pass through magnetic layer 2 and layer 8 having high magnetic permeability and magnetic layer 2 facing main magnetic pole 22, thereby forming the residual magnetization in the direction of thickness of magnetic layer 2 facing main magnetic pole 22 to effect the vertical magnetic recording.

On the other hand, the reproduction is carried out by detecting the changes in the magnetic flux corresponding to the information recorded on the magnetic layer 2 of recording medium 1 by the tip of main magnetic pole 22 to induce voltages corresponding to said changes in the magnetic flux through coils 24, 24 wound around auxiliary magnetic poles 23, 23 and picking up the sum of output voltages through coils 24, 24.

As shown in said embodiment, the magnetization of magnetic flux 28 from each auxiliary magnetic pole 23 through layer 8 having high magnetic permeability of recording mediuim 1 to main magnetic pole 22 is limited to the portion perpendicular to moving direction A of recording medium 1 by arranging auxiliary magnetic poles 23, 23 at the both sides of main magnetic pole 22 perpendicular to moving direction A of recording medium resulting in the magnetization of substantially vertical component on the side of moving direction A to improve drastically the recording density on the side of moving direction A. Moreover, by tapering the tip portions of auxiliary magnetic poles 23, 23 to the direction of main magnet pole 22 in suitable angles as shown in FIG. 5, the flow of magnetic flux 28 is forced to be concentrated in the sides of main magnet pole 22 to enhance the effect for preventing the magnetization through recording medium 1 to the moving direction A to achieve ideal vertical magnetization. The decrease of recording density due to the saturation of layer 8 having high magnetic permeability by dividing magnetic flux by providing two auxiliary magnetic poles 23, 23. Furthermore, since closed magnetic paths are formed from each auxiliary magnetic pole 23 through layer 8 having high magnetic permeability to main magnetic pole 22 during the recording and reproduction, the magnetic head repels markedly external noises to enable highly effective recording and regeneration. Still further, since the magnetization of horizontal component to the side of moving direction A of recording medium 1 is is difficult by reducing gaps 29 between main magnetic pole 22 and auxiliary magnetic poles 23 to shorten the magnetic paths from auxiliary magnetic poles 23 through layer 8 having high magnetic permeability to main magnetic pole 22 by arranging each auxiliary magnetic pole 23 to main magnetic pole 22 perpendicular to moving direction A of recording medium 1, high efficiencies of recording and regeneration can be greatly improved. Still further, said efficiencies can be further improved and the magnetic resistance is enhanced between main magnetic pole 22 and auxiliary magnetic poles 23 by tapering the tip portions of auxiliary magnetic poles 23 to the sides of main magnetic poles at a predetermined angle, so as to magnetic flux leaked from auxilairy magnetic poles 23 directly to main magnetic pole 22 and to enhance the recording density.

In addition, since both auxiliary magnetic poles 23, 23 can be attached directly to main magnetic pole 22, the vertical magnetic head can be installed on one side of the recording medium in a similar manner to heads employed in conventional video tape recorder (VTR) and magnetic disk and handled by simple mechanism.

Although the convergent portions 27 formed at the legs of each auxiliary magnetic pole 23 provides tapezoidal sections, the converged portions may provide rounded trapezoidal sections or main bodys wound coils 24 may provide the same trapezoidal sections as the legs.

Although the above-mentioned embodiment comprises two auxiliary magnet poles 23, 23, it should be noticed that the present invention also includes an emboidment attaching one auxiliary magnetic pole. Such an embodiment incurs disadvantages but it is desirable when a head having a small head width is required unavoidably such as the head for a VTR, etc.

Further more, it is possible that the outer sides of tips of magnetic materials 25, 25 having high magnetic permeability and attached at the inner sides thereof to the both sides of main magnetic pole 22 can be tapered so as to converge to the tips for converging the magnetic flux fed to main magnetic pole 22 at the tip. It is desirable to such a case to reinforce the notched portions with nonmagnetic materials. Thus, magnetic pole 22 may be integrated with magnetic materials 25, 25 having high magnetic permeability at the both sides of pole 22.

Still further, the tip of main magnetic pole 22 can be reinforced by connecting it with the tips of auxiliary magnetic poles by non-magnetic material having small magnetic permeability so as to prevent the breaking of main magnetic pole 22, etc. when recording medium 1 is moved or stopped abruptly.

In the above-mentioned embodiments, recording medium 1 is conveyed, but such reinforcement is particularly effective when the head is moved or stopped mainly at a high speed as in a VTR, etc. Moving direction A of recording medium 1 in the above description not only implies the moving direction when recording medium 1 is coveyed but also the relative moving direction of recording medium 1 with respect to the head.

The present invention includes also a vertical magnetic head wherein the direction connecting the main magnetic pole and auxiliary magnetic poles, i.e. the plane including the main and auxiliary magnetic poles is perpendicular to moving direction A of the recording medium and methods for recording or reproducing.

Figure 3:
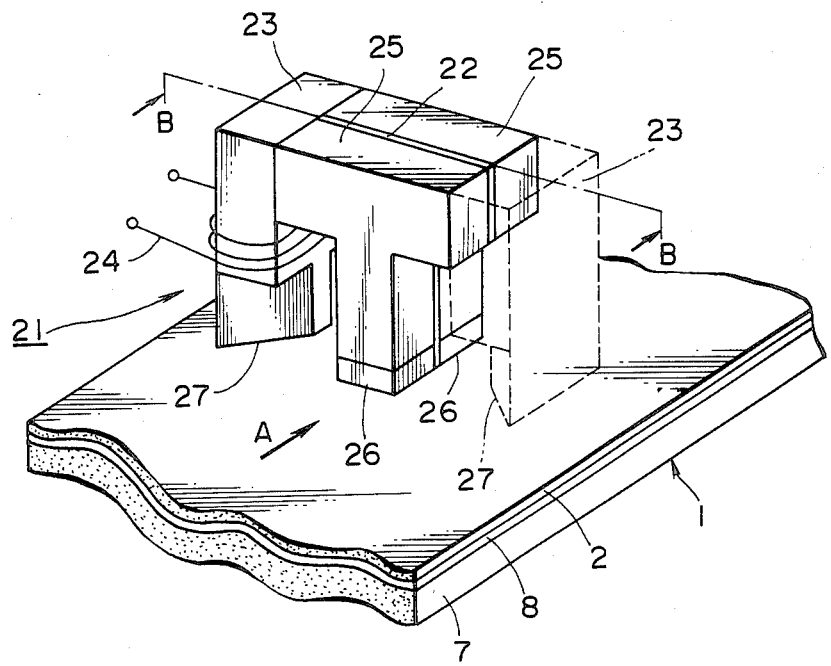

In addition, coil 24 is not limited to that wound around the location as shown in FIG. 3 but may be wound around the legs of auxiliary magnetic poles. Further more, the coil may be wound around the thickened leg of main magnetic pole or around the thickened portions connected with the auxiliary magnet poles.

As mentioned hereinabove, the auxiliary magnetic poles are arranged perpendicular to the moving direction of recording medium according to the present invention, the divergence of magnetic flux with respect to the moving direction of the recording medium can be prevented in order to enhance the recording density to the moving direction. In addition, since the recording and reproducing are carried out by forming closed magnetic paths through recording medium, the head rejects external noises, thus the operations can be effectively carried out with higher S/N ratio.

It should be obvious that the present invention can be modified within a wide range without departing from the spirit and range of the present invention.

Accordingly the present invention should not be restricted to particular embodiments except with reference to the attached claims.

What is claimed is:

1. A vertical magnetic head comprising:
a thin film main magnetic pole having high magnetic permeability, said main magnetic pole has a tip facing the surface of a magnetic recording medium, said thin film main magnetic pole positioned such that the thickness of said thin film is generally in the same direction as the moving direction of the magnetic recording medium;
at least one auxiliary magnetic pole having a tip facing said magnetic medium and having a body, said tip formed separate from the tip of the main magnetic pole, the tip of said auxiliary magnetic pole being spaced from said main magnetic pole in a direction generally transverse to the moving direction of the magnetic recording medium and also, said tip of said auxiliary magnetic pole having a substantially larger cross-sectional area than said tip of said main magnetic pole, and wherein the tip of said auxiliary magnetic pole is tapered, in a plan view, in the direction of said main magnetic pole, such that the narrow part of the tapered tip of said auxiliary magnetic pole is nearer said main magnetic pole than the wide part of the tapered tip, and wherein said main magnetic pole and the body of said auxiliary magnetic pole are attached to one another; and a coil winding wound around the body of said auxiliary pole.

2. The vertical magnetic head of claim 1, wherein a second auxiliary magnetic pole is provided on the opposite side of said main magnetic pole with respect to said one auxiliary magnetic pole, said second auxiliary magnetic pole having the same construction as said one auxiliary magnetic pole.

3. The vertical magnetic head of claim 1, wherein said main magnetic pole comprises a thin film of high magnetic permeability sandwiched between two thick-walled magnetic members having high magnetic permeability, with non-magnetic members provided to sandwich the tip of said main magnetic pole therebetween rather than said thick-walled members.

* * * * *